US008754943B2

(12) United States Patent
Klaerner et al.

(10) Patent No.: US 8,754,943 B2
(45) Date of Patent: Jun. 17, 2014

(54) METHOD AND APPARATUS FOR PROTECTING TROOPS

(75) Inventors: Mark A. Klaerner, Round Rock, TX (US); Evan Corwin, Bastrop, TX (US); Mark A. Middione, Scotts Valley, CA (US); Christopher J. Kelly, San Jose, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1378 days.

(21) Appl. No.: 11/991,032

(22) PCT Filed: Apr. 3, 2007

(86) PCT No.: PCT/US2007/008070
§ 371 (c)(1),
(2), (4) Date: Jun. 3, 2010

(87) PCT Pub. No.: WO2008/048370
PCT Pub. Date: Apr. 24, 2008

(65) Prior Publication Data
US 2010/0238288 A1 Sep. 23, 2010

Related U.S. Application Data

(60) Provisional application No. 60/789,172, filed on Apr. 4, 2006.

(51) Int. Cl.
*H04N 7/18* (2006.01)
*B60Q 1/00* (2006.01)
*F41H 5/26* (2006.01)

(52) U.S. Cl.
CPC ............... *B60Q 1/0023* (2013.01); *F41H 5/26* (2013.01); *H04N 7/18* (2013.01)
USPC ...................................... 348/148; 340/425.5

(58) Field of Classification Search
CPC ........ B60Q 1/00; B60R 2011/00; F41H 5/00; F41H 7/00; H04N 7/00
USPC ........................... 348/148, E7.08; 340/425.5
See application file for complete search history.

(56) References Cited

U.S. PATENT DOCUMENTS

| 4,214,266 A | 7/1980 | Myers |
| 4,277,804 A | 7/1981 | Robison |

(Continued)

FOREIGN PATENT DOCUMENTS

| CA | 2087755 | 7/1994 |
| DE | 29806638 U1 | 6/1998 |

(Continued)

OTHER PUBLICATIONS

EP07861280.1 Supplementary European Search Report/PCT/US2007008070 mailed Feb. 4, 2013.

*Primary Examiner* — Tauqir Hussain
*Assistant Examiner* — Ebrahim Golabbakhsh
(74) *Attorney, Agent, or Firm* — Daniel J. Long

(57) ABSTRACT

A method and apparatus for protecting the troops when they exit an armored vehicle is provided by utilizing the universal tail light assembly and providing the assembly with wide field-of-view cameras and other sensors, with screens or displays located within the vehicle to provide situational awareness of the rear of the vehicle, thus to alert troops and their commanders as to external threats prior to troop deployment. In one embodiment, two wide-angle infrared cameras are retrofitted to existing universal tail light assemblies to either side of the vehicle, with the cameras having overlapping fields of view to permit generation of a panoramic view. Moreover, additional sensors such as ultrasonic sensors, LIDARs and laser range finders can be located in the universal tail light assembly, with the subject system not requiring breach of the already-existing armor for the vehicle.

8 Claims, 12 Drawing Sheets

(56) References Cited

U.S. PATENT DOCUMENTS

| | | |
|---|---|---|
| 4,626,850 A | 12/1986 | Chey |
| 4,892,345 A | 1/1990 | Rachael, III |
| 4,910,591 A | 3/1990 | Petrossian et al. |
| 4,937,796 A | 6/1990 | Tendler |
| 5,001,558 A | 3/1991 | Burley et al. |
| 5,121,200 A | 6/1992 | Choi |
| 5,214,408 A | 5/1993 | Asayama |
| 5,289,321 A | 2/1994 | Secor |
| 5,574,443 A | 11/1996 | Hsieh |
| 6,534,884 B2 | 3/2003 | Marcus et al. |
| 6,891,563 B2 | 5/2005 | Schofield et al. |
| 6,915,728 B2 | 7/2005 | Renwick et al. |
| 6,977,584 B2 | 12/2005 | Milliken |
| 7,029,057 B2 | 4/2006 | Izabel et al. |
| 7,068,289 B2 | 6/2006 | Satoh et al. |
| 7,079,017 B2 | 7/2006 | Lang et al. |
| 7,102,496 B1 | 9/2006 | Ernst, Jr. et al. |
| 7,106,183 B2 | 9/2006 | Hong |
| 7,110,021 B2 | 9/2006 | Nobori et al. |
| 7,111,968 B2 | 9/2006 | Bauer et al. |
| 7,138,938 B1 | 11/2006 | Prakah-Asante et al. |
| 2003/0043280 A1* | 3/2003 | Nagao et al. ............... 348/216.1 |
| 2004/0075544 A1* | 4/2004 | Janssen ........................ 340/435 |
| 2004/0100443 A1* | 5/2004 | Mandelbaum et al. ....... 345/158 |
| 2004/0160786 A1* | 8/2004 | Bauer et al. .................. 362/545 |
| 2005/0195383 A1* | 9/2005 | Breed et al. ................. 356/4.01 |
| 2005/0276448 A1* | 12/2005 | Pryor ........................... 382/103 |

FOREIGN PATENT DOCUMENTS

| | | | |
|---|---|---|---|
| FR | 2433705 | A1 | 3/1980 |
| WO | WO96/38319 | A2 | 12/1996 |

* cited by examiner

METHOD AND APPARATUS FOR PROTECTING TROOPS

RELATED APPLICATIONS

This application claims rights under 35 USC §119(e) from U.S. Application Ser. No. 60/789,172 filed Apr. 4, 2006, the contents of which are incorporated herein by reference.

FIELD OF THE INVENTION

This invention relates to protection of troops exiting a vehicle and more particularly to providing a rear viewing camera system with wide-angle cameras and other sensors mounted in universal tail light assemblies for the vehicle.

BACKGROUND OF THE INVENTION

Infantry soldiers riding inside armored fighting vehicles may often lack the life-critical capability to see what is in the vicinity behind the vehicle before the ramp is dropped and the soldiers dismount onto the battlefield. Lacking an ability to see the battlefield behind the vehicle in various light conditions before dismounting prevents the squad leader or team leader from reviewing and rehearsing key immediate actions and assigning areas of responsibility. Secondarily, the driver of the vehicle may have limited visibility behind the vehicle such that when backing up, the driver may inadvertently damage objects behind the vehicle or cause injury. It will be appreciated that because many armored vehicles such as the Bradley Fighting Vehicle are on patrol in populated areas, there is a requirement to have situational awareness before the troops move out of the vehicle. In short, there must be a system to advise troops before they exit the vehicle.

While there are a large number of systems that provide rear view cameras for vehicles, none provide situational awareness for troops housed within a vehicle who have limited ability to see what is going on outside of the vehicle.

Most importantly, armored vehicles are provided with armor plate and other protective devices, with the vehicle armor being designed to provide hull integrity for assuring maximum protection by eliminating areas that can be breached.

Were one to wish to provide such armored vehicles with external cameras, sensors and the like, connecting them to electronics and monitors within the vehicle of necessity would require putting holes in the armor, a breach of hull integrity. Thus mounting external units on an armored vehicle is to be avoided because the security afforded by the originally designed armor is impaired.

As a result, there is a need to provide existing vehicles with retrofit situational awareness packages that do not alter the impregnability of the armoring system originally provided for the vehicle.

Moreover, in addition to the need to provide situational awareness, if one were to rely only on cameras operating in the visible region of the electromagnetic spectrum, insurgents or enemy soldiers might be able to hide behind existing objects and blend in. To become visible, it would therefore be appropriate to use near-infrared or infrared cameras so that the body heat of an insurgent would produce a thermal image that when presented on a screen produces a striking indication of the presence of the enemy.

Finally, in order to provide situational awareness, it would be desirable to provide a retrofit kit that included laser range finders, LIDARs or other radar-like sensors so as to complement camera-generated images and provide positional data for potential targets that can be displayed prior to troop deployment. Such devices could also include acoustic ranging devices.

SUMMARY OF INVENTION

The purpose of the subject invention to provide situational awareness to troops and their commanders prior to the time the troops move outside of the vehicle. In this way, troops and/or team leaders can assess outside threats before troop deployment and address whatever corrective action needs to be taken.

In one embodiment of the subject invention, a universal tail light assembly is retrofitted with cameras and other sensors that are connected to modules inside the armored vehicle using existing wiring, such that the hull of the vehicle is not breached. The reason that there need be no hull breach is because the tail light assemblies already have a hull-routing system through the armor designed for maximum protection.

It is noted that almost all armored fighting vehicles have tail light assemblies, with most having incandescent bulbs. Because of problems with incandescent bulbs, many of the armored fighting vehicles are upgrading to LED bulbs. Also the tail light assemblies are usually mounted at high points on the vehicle. When these tail light assemblies are retrofitted with cameras, this gives an enlarged vertical field of view or field of regard. Specifically, the lookdown angle can be improved due to the high camera mounting point both for surveillance and to prevent running over troops at the back of the vehicle when backing. Also the camera can be shimmed to look higher and farther for detecting individuals on low buildings and in trees. As an additional benefit, the height protects the camera and other co-located sensors from debris.

As mentioned before, all tail lights have existing wiring that passes from the exterior light assemblies through the armor to the interior of the platform. As will be appreciated, there are pre-existing wiring holes through the armor. As will be seen, these wiring holes are at optimal locations for new sensors as well as video cameras.

While in the past there have been cameras mounted on vehicles, these cameras were not intended to provide situational awareness behind the vehicle for the squad or team leader, nor were they mounted into tail or front marker lights. Moreover, the cameras that have been used are very narrow field-of-view devices, with highly magnified, directed optics to be able to direct firepower. Typically these cameras point forward.

In the subject invention and as part of the preferred embodiment, a pair of wide-angle 70° infrared or near-infrared cameras are mounted to either side of the vehicle in the tail light pods or assemblies. In these positions the two cameras have an overlapping ultrawide 140 field of regard so that all enemy activity at the back of the vehicle can be observed. In the preferred embodiment the images from the cameras are either shown separately on screens within the vehicle or are stitched together in a panoramic display.

In addition to the near-infrared or infrared cameras that provide luminescent thermal images of individuals in the field of view of the infrared cameras, the universal tail light assembly housings are large and can house a fair amount of microelectronics because of the significant volume of these assemblies. Thus, other microelectronic sensors can be embedded within the housing without changing the general envelope or location of the existing tail lights.

In addition to lasers and LIDARs that can be mounted in the tail light assembly, ultrasonic backup sensors also may be co-located with the cameras and other sensors. Moreover, an array of LED bulbs can be utilized not as typical tail lights, but to illuminate the scene behind the vehicle. Thus, near-infrared illumination can be utilized to supplement existing light conditions to extend the range of the near-infrared cameras used. For instance, nighttime sensitivities of commercially available off-the-shelf near-infrared cameras are typically relatively low. In order to increase the range of such off-the-shelf near-infrared CCD cameras, it is useful in one embodiment to flood the field of view of the cameras with 880-nm radiation, thus to illuminate distant objects and make them observable with ordinary visible cameras with detectors sensitive to the near-infrared spectrum.

In summary, a method and apparatus for protecting the troops when they exit an armored vehicle is provided by utilizing the universal tail light assembly and providing the assembly with wide field-of-view cameras and other sensors, with screens or displays located within the vehicle to provide situational awareness of the rear of the vehicle, thus to alert troops and their commanders as to external threats prior to troop deployment. In one embodiment, two wide-angle infrared cameras are retrofitted to existing universal tail light assemblies to either side of the vehicle, with the cameras having overlapping fields of view to permit generation of a panoramic view. Moreover, additional sensors such as ultrasonic sensors, LIDARs and laser range finders can be located in the universal tail light assembly, with the subject system not requiring breach of the already-existing armor for the vehicle.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
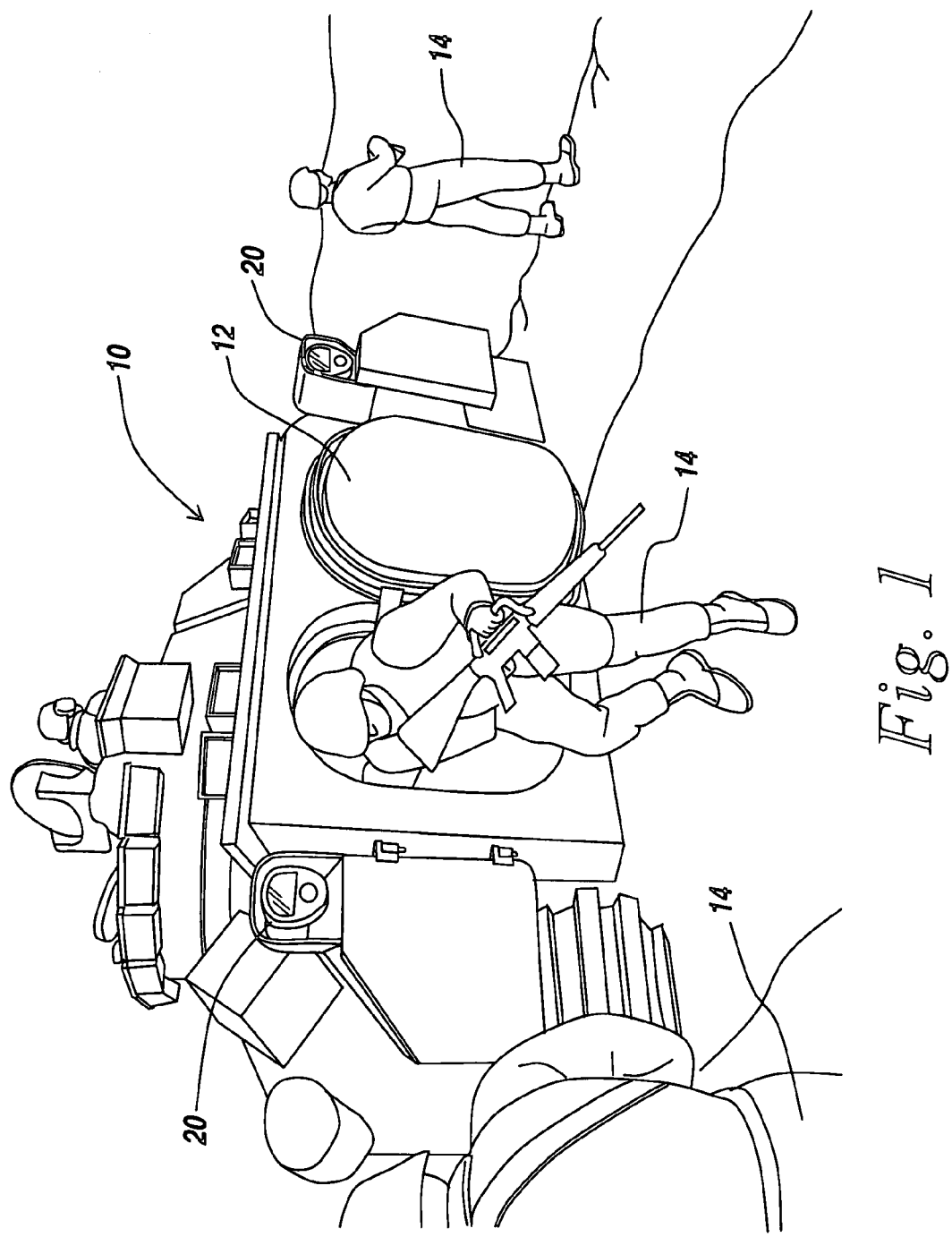
FIG. 1 is a diagrammatic illustration of the exiting of troops from the rear of a Bradley Fighting Vehicle in which the troops are vulnerable to threats from outside the vehicle.

Prior to describing the subject invention, the following outlines requirements for a situational awareness system.

While the following description is focused upon the Bradley Armored Fighting Vehicle, application of the subject invention is equally valid for any armored, tactical, combat, or support vehicle requiring added situational awareness about the platform.

In one embodiment the subject system is a daytime rear viewing system. Some anticipated performance and environmental requirements imposed in order to define hardware that will withstand the rigors of long-term use and combat conditions are summarized in Table 1.

TABLE 1

Top Level System Requirements

| Reqmnt. | Parameter | Description |
|---|---|---|
| 1.2.1 | Temperature - Operational | The system shall withstand and operate correctly when exposed to temperatures between −40° C. and +71° C. Verify per MIL-STD-810E, Method 501.4, High Temperature, Procedure II. Verify per MIL-STD-810E, Method 502.4, Low Temperature, Procedure II. |
| 1.2.2 | Shock | The system shall withstand and continue to operate correctly when subjected to the shock induced by tracked vehicle operation and weapon discharge. Verify per MIL-STD-810E, Method 516.5, Procedure I, Ground Equipment |
| 1.2.3 | Vibration | The system shall withstand and continue to operate correctly when subjected to the vibrations induced by tracked vehicle operation across various terrain conditions. Verify per MIL-STD-810E, Method 514.5, Procedure I, Category 20 (Ground Mobile) |
| 1.2.4 | Rain | All system components mounted externally to the hull shall operate satisfactorily during and after exposure to heavy rain. Verify per MIL-STD-810E, Method 506.4, Procedure I. |
| 1.2.5 | Humidity | All system components mounted externally to the hull shall remain operational during and after exposure to relative humidity up to 100%. Verify per MIL-STD-810E, Method 507.4. |
| 1.2.6 | Low Light Performance | The system shall be capable of providing situational awareness while subject to ¼ moon (~3.0e−4 lux) conditions. Verify by analysis. |
| 1.2.7 | Field of Regard | The system shall provide sufficient Field of Regard to ensure coverage of the entire threat perimeter behind the vehicle ramp. Verification pending customer input. |
| 1.2.8 | Power | The system shall perform to the requirements specified herein when supplied with available vehicle power. Verify by inspection. |
| 1.2.9 | Probability of Detection (Pd) | The system shall be capable of detecting and displaying a NATO std. man target with a 50% probability at a minimum range of 250 |

TABLE 1-continued

Top Level System Requirements

| Reqmnt. | Parameter | Description |
|---|---|---|
| | | yards during day light conditions. Verify by analysis. |
| 1.2.10 | Tail Light Operation | The tail light shall operate as originally designed and meet or exceed all performance requirements after modifications. Verify by inspection. |
| 1.2.11 | Hardware Location | No component of the system shall introduce a safety hazard to the vehicle occupants or impede movement in or out of any vehicle exits. Verify by inspection. |

As to hardware requirements, the top-level system requirements presented in Table 1 are allocated against the appropriate hardware subsystems. The requirements described in Table 2 represent what is readily on hand for each subsystem.

TABLE 2

Hardware Requirements

| Reqmnt. | Parameter | Description |
|---|---|---|
| 1.3.1 | Temperature - Camera | Operational: −40° C. to +70° C. Storage: −40° C. to +70° C. |
| 1.3.2 | Temperature - Monitor | Operational: −0° C. to +50° C. Storage: −20° C. to +60° C. |
| 1.3.2 | Shock - Camera | 100 g, <1 ms, 3 axis |
| 1.3.3 | Shock - Monitor | 30 g, <11 ms, 3 axis |
| 1.3.4 | Vibration | +3 db/Octave slope from 20 Hz to 80 Hz, 0.04 G2/Hz from 80 Hz to 350 Hz and −3 db/Octave from 350 Hz to 2000 Hz, 6.06 Grms, 5 min/axis, 3 axis |
| 1.3.5 | Camera Sensitivity | 3.0e−4 lux (min) |
| 1.3.6 | Camera Resolution | 50% Pd NATO man @ 250 yards during daylight hours |
| 1.3.7 | Camera Field of View (FOV) | 51° (min - needs verification) |
| 1.3.8 | Camera Power Source | 6 to 12 VDC |
| 1.3.9 | Camera Mounting | Camera shall have provision for mounting to external structures |
| 1.3.10 | Monitor Resolution | 1280 × 1024 SXGA (min) |
| 1.3.11 | Monitor Contrast Ratio | 350:1 (min) |
| 1.3.12 | Monitor Power Source | 12 to 24 VDC |
| 1.3.13 | Monitor Power Consumpt. | ≤50 W |
| 1.3.14 | Monitor Depth | <3" |
| 1.3.15 | Redesigned Tail Lamp Form | Maintain Mil-Spec form requirements |
| 1.3.16 | Redesigned Tail Lamp Fit | Stay within protective loop |
| 1.3.17 | Redesigned Tail Lamp Function | Maintain current requirements |

In one embodiment, a top-level system would consist of a commercial off-the-shelf (COTS) camera and lens installed in a modified version of the MS52125 right and left rear tail light assembly. The output imagery is sent to a dedicated fixed or foldable high resolution LCD monitor mounted to one side of the rear ramp to provide situational awareness to soldiers prior to egress. In the case of the M2A3 variant, digital imagery is sent to any monitor in the vehicle to provide additional situational awareness.

Housing a camera in a modified right and left rear tail light has the following advantages: First, the tail light assembly occupies the best locations for the required camera field of view (FoV) and field of regard (FoR). Secondly, the camera cabling utilizes the existing tail light's wiring hull pass-throughs. Thirdly, the subject retrofit involves minimal labor to install due to the modular approach and the fact that there are no external vehicle modifications. Fourthly, the perimeter of the tail light is protected by an armored shield, whereas the retrofitted tail light assembly quasi-camouflages the sensor in the non-traditional location. Finally, there is significant room for growth to add other situational awareness sensors.

As to the situational awareness camera, a commercial off-the-shelf camera and lens may be selected. The selected camera is housed in a modified tail light assembly, singly or in pairs, and oriented such that it provides an overlapping FoV, which offers a wide-angle field of regard. There are many ruggedized commercial cameras small enough to fit within the reconfigured tail light volume.

As to the monitor used within the vehicle, an RS 170 monitor may be used to present imagery to the user. The selected monitor can be either fixed mounted or housed in a structure that is easily attached to the roof and firmly secures the monitor when it is folded flat.

A split screen capability can be added to any RS 170 monitor by using a standard split screen controller that is plugged between the cameras and monitor. This device has a very small footprint and allows a variety of operational modes to present imagery from two or more cameras.

Utilizing the current Bradley tail light form factor, MS52125B, a new assembly encloses a camera and maintains the stock footprint. The modifications include a minor relocation of the black out stop/tail functions. The remaining available area is modified with a mounting bracket to secure the specified camera and optics. The tail light lens assembly has a wavelength-specific window bonded in place to provide the required camera aperture. All circuits running to and from the light assembly utilize existing vehicle hull and tail light hole locations.

As to LED replacement bulbs, the incandescent bulbs in the original universal tail light assembly are replaced with substantially brighter, readily available LED assemblies. In addition to maintaining illumination requirements, the LED bulbs have the following added benefits. First, there is a long service life (100,000+ hrs) benefit. Secondly, there is a benefit of lower power in that LEDs draw less power than an equivalent incandescent lamp. There is better shock and vibration performance and lower heat generation.

It is important to note that there would be some life cycle cost savings associated with this approach due to the improvement in service life from ~300 hours for a standard automotive grade incandescent bulb to 100,000+ for the LED bulb. The associated life cycle cost savings are important when evaluating the implementation cost of the proposed system.

The cabling scheme takes two directions depending on Bradley variant and camera. An analog camera requires 12VDC vehicle power and utilizes a standard analog video cable to transmit data to the LCD monitor. If a digital format camera is chosen, 12VDC vehicle power is supplied and the digital data is sent via fire wire or similar digital carrier to the LCD monitor with the option of tying into the existing data bus on the digital Bradley. This arrangement gives rear viewing capability to all monitors in the vehicle and can be of significant benefit to the driver during backing. Note that existing hull routing is utilized to run all new cabling.

Ease of installation is a major factor when defining the system architecture. Keeping in mind that the hardware will probably be installed in the field, all hardware is designed as a direct replacement or retrofit in the case of the tail lights, and a simple bolt-on in the case of the monitor and bracket. All cabling utilizes existing hull pass-throughs. Therefore no new holes will need to be cut. No specialized coatings or processes are needed to complete installation and can occur in forward theaters or during force reset.

In one embodiment, the kit consists of: one or two modified tail light assemblies, fully assembled and tested with the camera, lens, and LED bulbs. This will be a direct bolt-on replacement to the existing Bradley tail light. Secondly, an LCD monitor is used, assembled into either a fixed or a flip-up bracket that can be easily bolted to the roof of the vehicle. The bracket also encloses any video and touch screen controllers and processors. Thirdly, retrofit includes all cabling, preformed and cut to length, and relevant documentation, including drawings, assembly instructions, and operator manuals.

The area occupied by the tail lights is an ideal location for additional sensors that can add new functionality and capability to the vehicle. The small, lightweight and low power approach can give the vehicle a growth path to selectively incorporate tail/head light functions (Hi Rel LEDs), laser warning functions, line-of-sight laser communication detection, MILES/OneTESS Laser Decoder, UV non-line-of-sight communications, passive IFF identification of friend or foe, and near IR or IR cameras.

In summary, what is provided is an affordable retrofit for situational awareness capability that can be readily provided to war fighters for use on ground combat vehicles in which this capability can be readily deployed.

It will also be appreciated that the advantages of converting exterior lights from incandescent bulbs to LEDs and then utilizing the remaining volume and power allocations for sensors include providing life saving situational awareness about the platform for soldiers before they exit the platform; providing a rear viewing driver's aid; providing a back-up obstruction sensor in the form of an ultrasonic ranging device; improving the life cycle maintenance costs of the platform; and adding sensor capability to an existing platform location which is both optimal for sensors and which creates no new obstructions on the platform. It will also be appreciated that, given that the location of the sensors is unexpected, in which the probability of sniper attacks on sensors is reduced.

Referring now to FIG. 1, in one battlefield scenario an armored vehicle 10 is provided with a protected door 12 out of which troops 14 exit during patrol and other missions. It will be appreciated that the troops are ferried within vehicle 12 where they have either no or limited visibility to the surrounding area. It is important therefore to alert the troops before their exit as to what awaits them on the outside of the vehicle. As will be appreciated, troops 14 may be subjected to enemy fire or insurgent action upon exiting the vehicle, for which they must be prepared.

It is the purpose of the subject invention to provide tail light assemblies 20 with cameras or other sensors to be able to surveil the environment to the rear of the vehicle such that the signals from these cameras or sensors are displayed interior to the vehicle to the team leaders or commanders as well as to the troops so that those inside the vehicle can ascertain what awaits. The subject system is therefore described as a situational awareness system.

As mentioned hereinbefore, while cameras have been mounted on vehicles as retrofits to the vehicle, the mounting of these cameras and other sensors requires holes in the vehicle armor, thus breaching hull integrity, with the holes being required for the hard-wiring and routing of signals to and from the cameras or sensors to modules within the vehicle.

Because there is a universal need for all armored vehicles to be retrofitted to provide situational awareness for troops within the vehicle, in the subject invention a universal standard tail light assembly is adapted to house the cameras and sensors utilized to provide the surveillance and situational awareness.

It is an important feature of the subject invention that existing tail light assemblies can be modified and retrofitted to provide the situational awareness function. As will be seen, existing wiring harnesses and hull routing can be utilized to make the retrofit a seamless process without impairing armor integrity.

Figure 2:
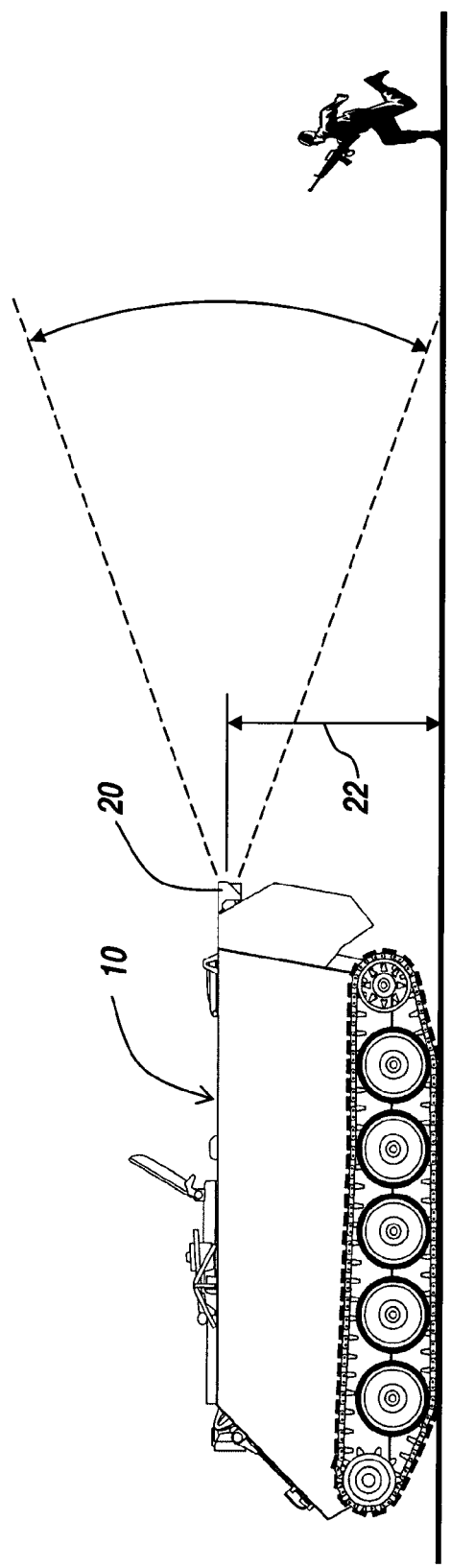
FIG. 2 is a diagrammatic view of the subject system in which a video camera is mounted in the universal tail light assembly of a troop-carrying vehicle relatively high above the ground to widen the field of view of the camera.

Moreover, as seen in FIG. 2, armored vehicle 10 has its tail light assembly 20 mounted in a fairly high location as indicated by arrow 22 to be above the terrain surface 24. In many instances such as with the Bradley Fighting Vehicle, this distance can be between 5 and 6 feet, or as little as 4 feet for of an Abrams tank.

Regardless, the height of the mounting of the tail light assembly and thus the cameras utilized therein provide the ability to shim the cameras for downward-looking purposes if such is desired so that close-in activity to the vehicle can be adequately presented to the troops therein.

Alternatively, the camera can be shimmed upwardly for a longer lookout or range capability, for instance to detect individuals at greater heights than normally would be associated with bumper-mounted sensors and the like.

The height of the tail light assembly also assists in keeping the sensors free of debris as they are removed from the point of contact between the vehicle and the terrain surface.

Figure 3:
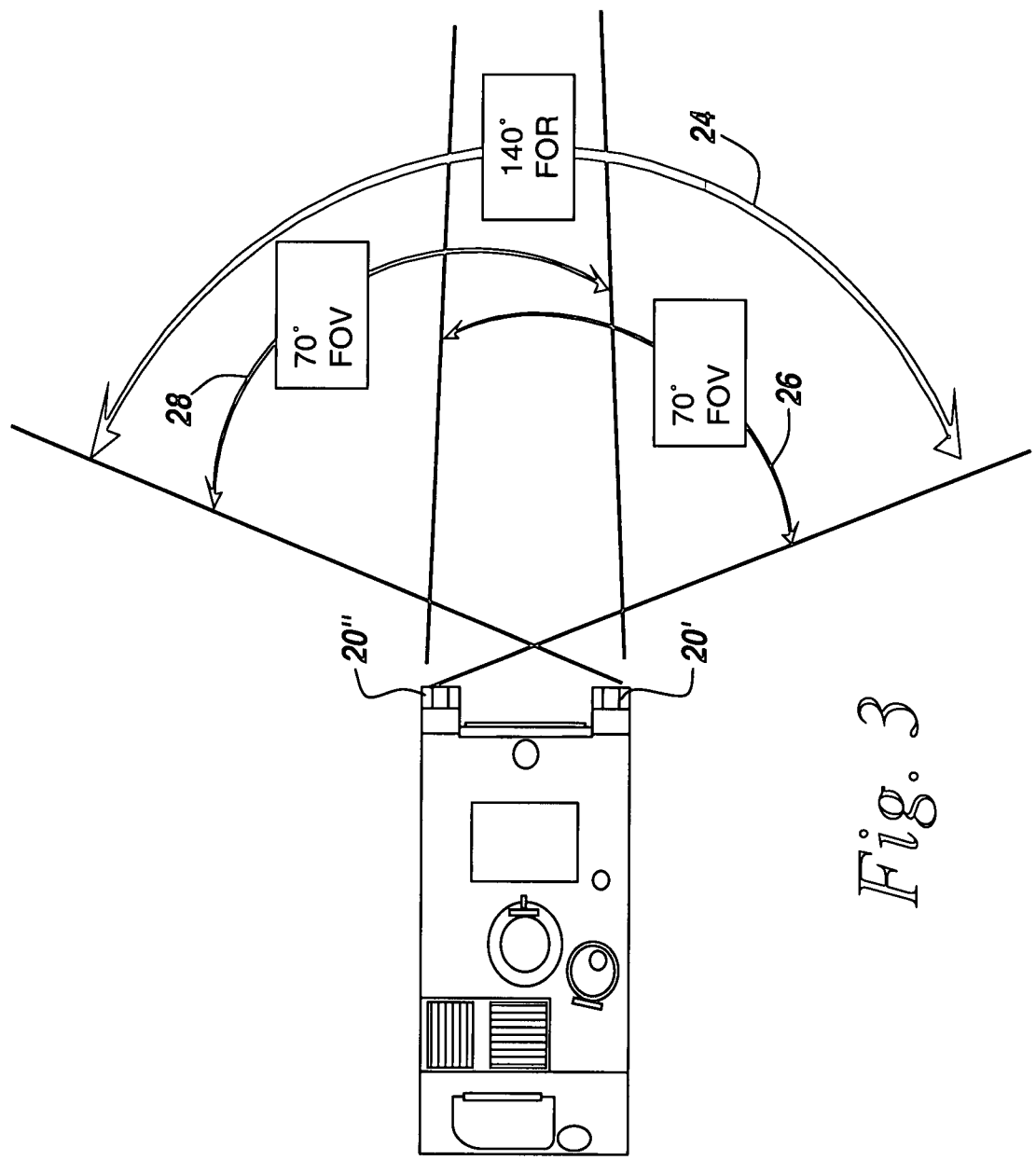
FIG. 3 is a diagrammatic and top view of the troop-carrying vehicle of FIG. 2, indicating a 70° field of view for each of a pair of infrared cameras mounted in a crossfire arrangement to provide a 140° wide-angle field of regard.

Referring now to FIG. 3, in one embodiment of the subject invention, extremely wide-angle cameras, in particular near-infrared or infrared cameras mounted in adjacent tail light assemblies 20' and 20'' have crossfire fields of view as illustrated by arrow 24 to be in excess of 140°, thus to provide the system with a combined field of regard of 140°.

What can be seen is that with cameras appropriately positioned in adjacent rearwardly-facing tail lights, relatively wide 70° field of view cameras such as illustrated by arrows 26 and 28 can provide a panoramic view of the area surrounding the rear of the vehicle due to the wide-angle combined field of regard.

The 140° field of regard may be displayed either by providing two monitors, each monitoring the output of different cameras, with the monitors in one embodiment being adjacent to one another; whereas a large horizontal width monitor may be provided and the images from the two cameras stitched together by conventional stitching techniques.

The wide field of view and the utilization of a pair of cameras at the rear of the vehicle provides increased surveillance at the rear of the vehicle and a field of regard much greater than, for instance that associated with cameras used as backup cameras for civilian vehicles.

Moreover, the wide angle combined field of regard provides the troops with a much greater protection than narrow field-of-view cameras which must be swept and which are ordinarily utilized for fire control.

Figure 4:
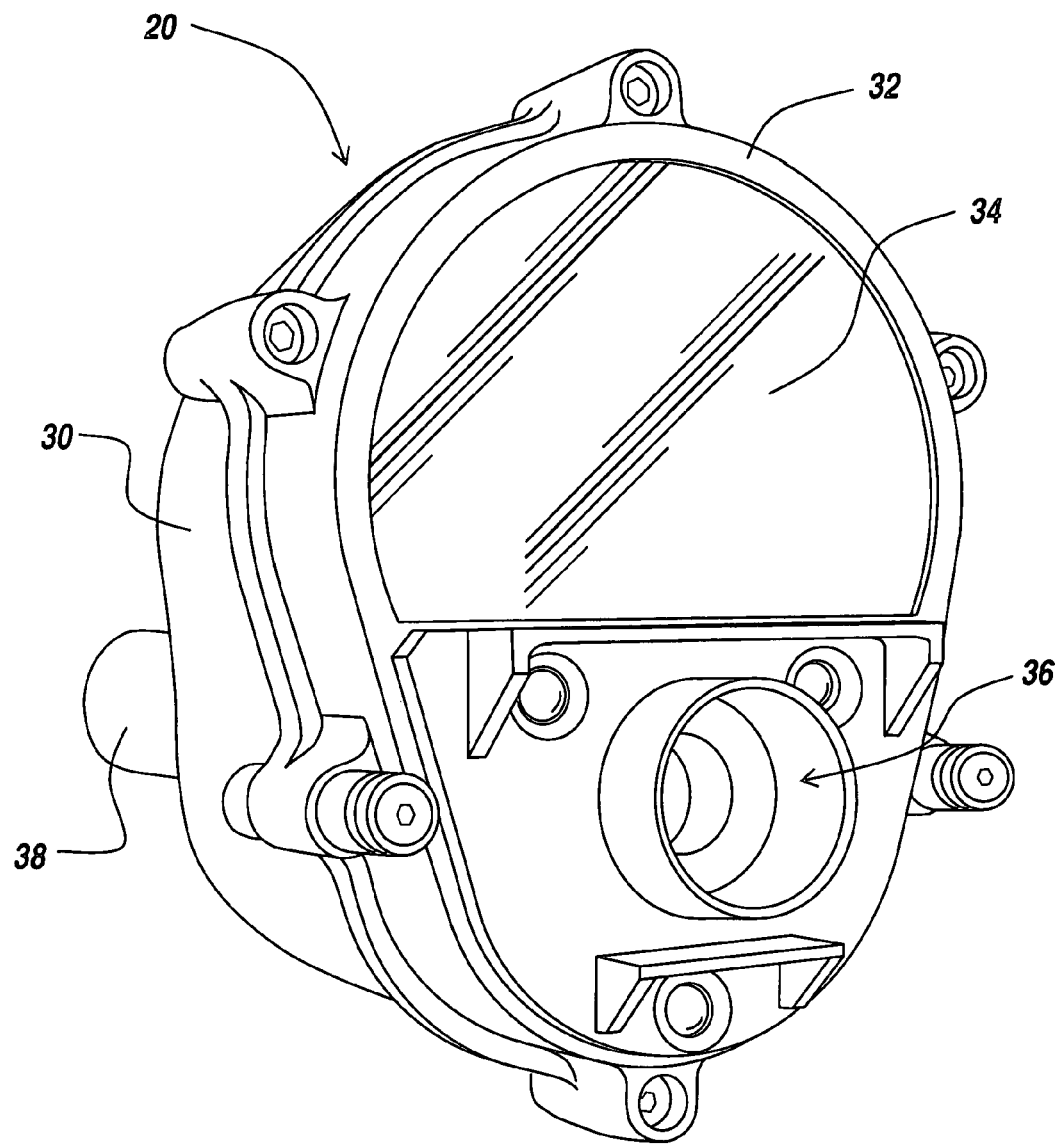
FIG. 4 is a diagrammatic illustration of the universal tail light assembly into which a portion of the subject system is installed.

Referring to FIG. 4, one universal tail light assembly 20 includes a clamshell arrangement in which one half of the clamshell 30 is bolted to the front portion of the clamshell 32 in which the tail light assembly has a large lens area 34 used for service lamps within the assembly so that they can be seen in the normal manner.

However, this tail light assembly is provided with an aperture 36 through which an internally mounted CCD or IR camera looks out of, such that the universal tail light assembly having a great enough volume can provide for cameras and sensors in addition to the incandescent lights normally used for the tail light.

Also illustrated is the hull routing tube 38 through which the wiring to the tail light assembly passes.

Since the vehicle armor is designed to have apertures through the armor that accommodate the hull routing cables, there is no change to the armor design due to the use of the existing tail light assemblies for the situational awareness function.

Figure 5:
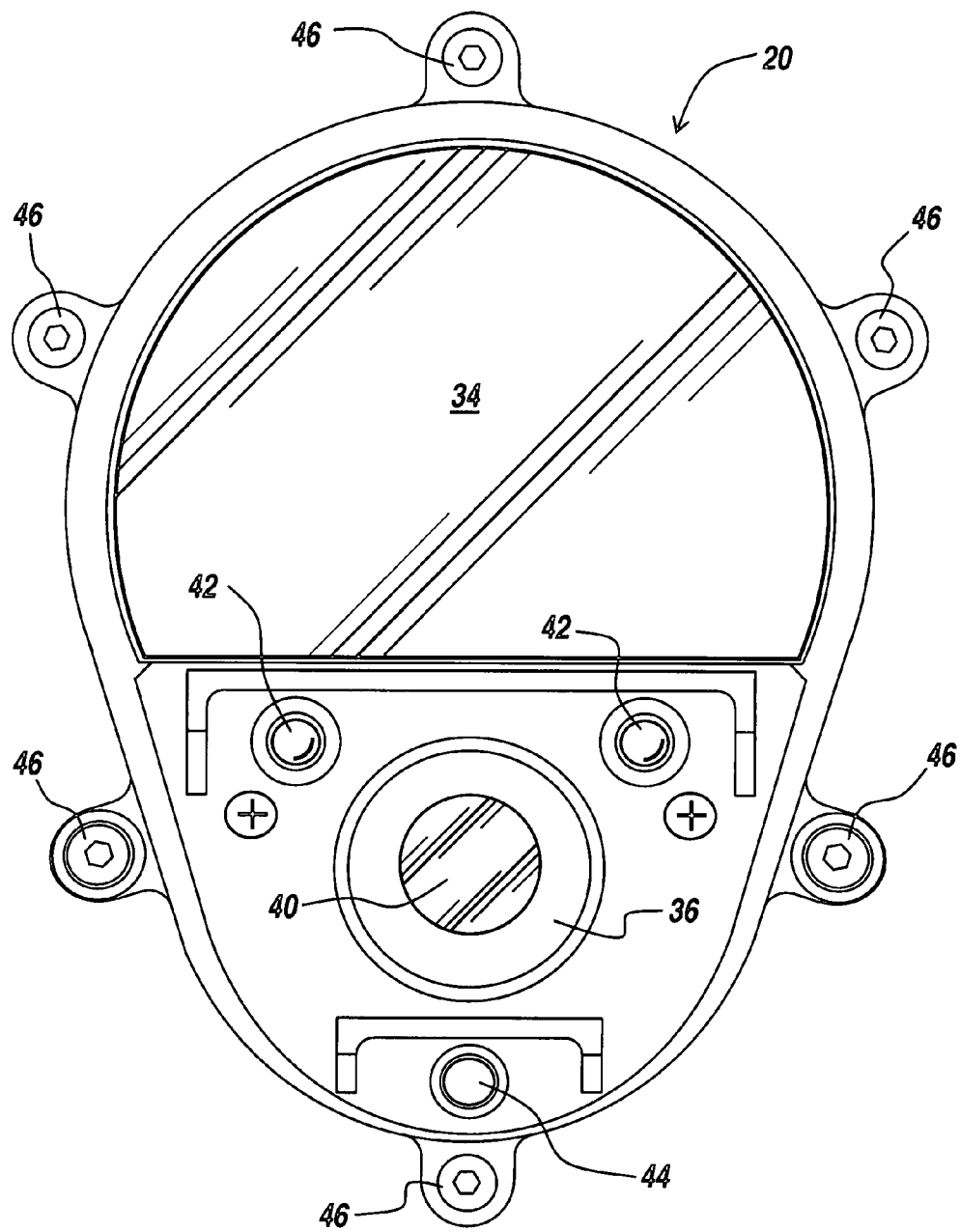
FIG. 5 is a front view of the tail light assembly of FIG. 4, indicating an aperture for the lens of a camera installed within the tail light assembly.

A front view of the tail light assembly of FIG. 4 is shown in FIG. 5, clearly showing the tail light lens 34 and aperture 36, which when uncovered provides a lens 40 of an internally carried CCD or IR camera with an aperture to see through. What can be seen are positions 42 and 44 for blackout lenses surrounding the camera aperture 36. In one embodiment a near-infrared CCD camera is mounted within the assembly. As will be appreciated, the two clamshells of the assembly are bolted together by bolting structures 46.

Figure 6:
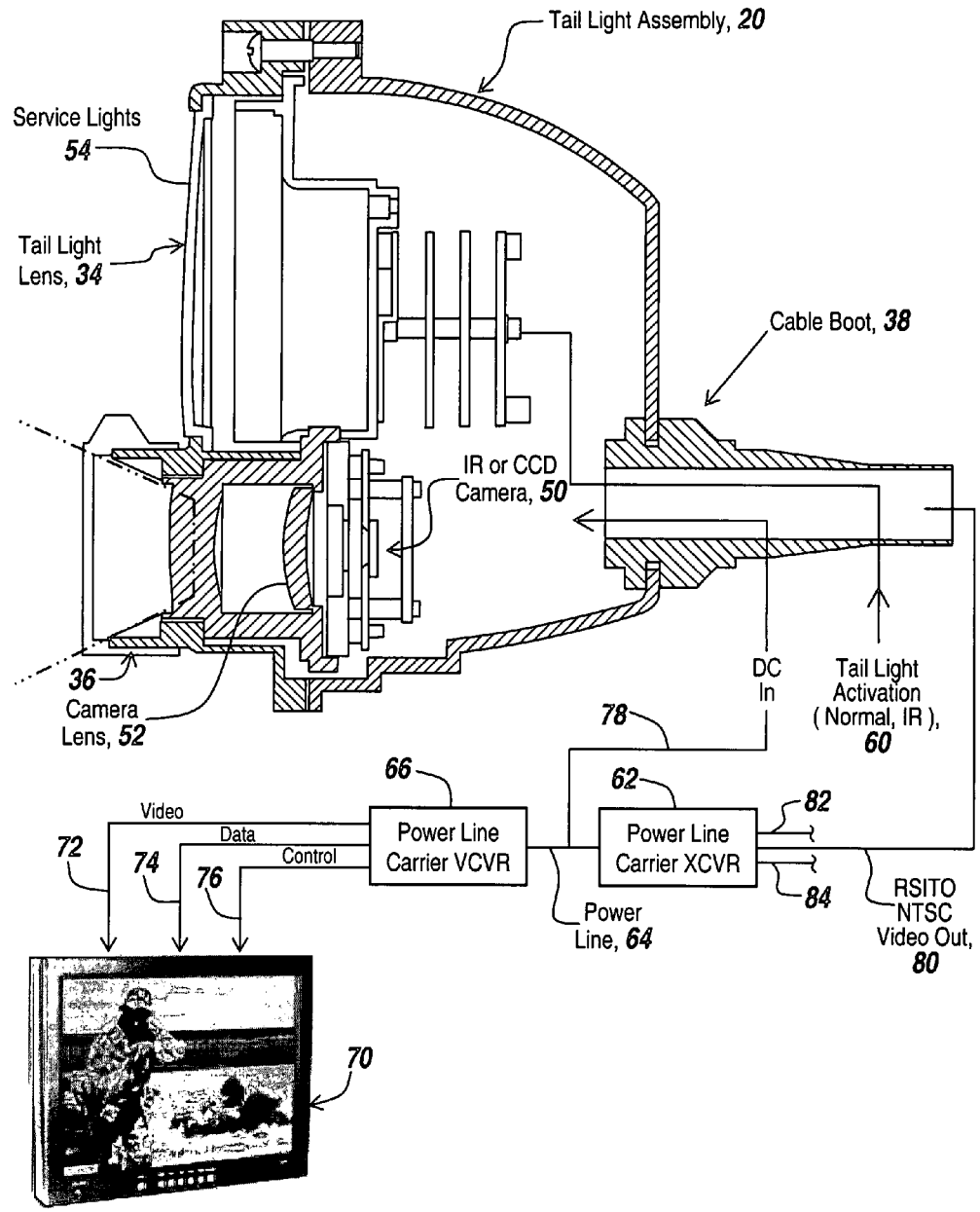
FIG. 6 is a diagrammatic illustration of cameras and other sensors within the tail light assembly beneath the tail light lens, also indicating hull routing and the utilization of existing wiring and power lines.

Referring now to FIG. 6, the situational awareness or surveillance system utilizing tail light assembly 20 is shown in cross-section in which an infrared or near-infrared CCD camera 50 is located within the body of the tail light assembly, with the camera having a camera lens 52 that peers out through aperture 36, with the lens system providing an ultra-wide angle field of view. Tail light lens 34 covers service lights generally in the area illustrated by 54, which in the preferred embodiment include an LED array to replace the traditional incandescent bulbs.

Wiring for the camera and its control electronics as well as for the service lights is protected and contained in cable boot 38, which then passes through the armor with existing vehicle wiring and thence to service light activation module 60. Either dedicated or existing vehicle wiring can be utilized as the video, data and control path between tail light assembly 20 and the control/display unit 70. In cases where existing power wiring is used by this interface, a power line carrier transceiver 62 can be used adjacent to tail light assembly 20, in turn coupled at the other end of the power line wiring 64 to an identical power line carrier transceiver 66 adjacent to the control/display unit 70. The power line and other wiring 64 exists throughout the vehicle and may be used and tapped into in order to connect the CCD camera or other sensors to a display 70 within the vehicle. The display has the usual video, data and control lines thereto, here illustrated at 72, 74 and 76, with display 70 in one embodiment bifurcated to show images from the aforementioned two cameras. Here, for instance, the left-hand camera shows an insurgent 80 adjacent a tree 82, whereas a building 84 exists to the right and is viewed by the right-hand camera.

Note that power for the camera can be tapped off power line 64 as illustrated at 78.

Note that the output of the camera is available over video line 80 to power line carrier transceiver 62, in one embodiment as an RS-170 NTSC video output for the camera. Other lines 82 and 84 carry data and control signals to the camera.

Figure 7:
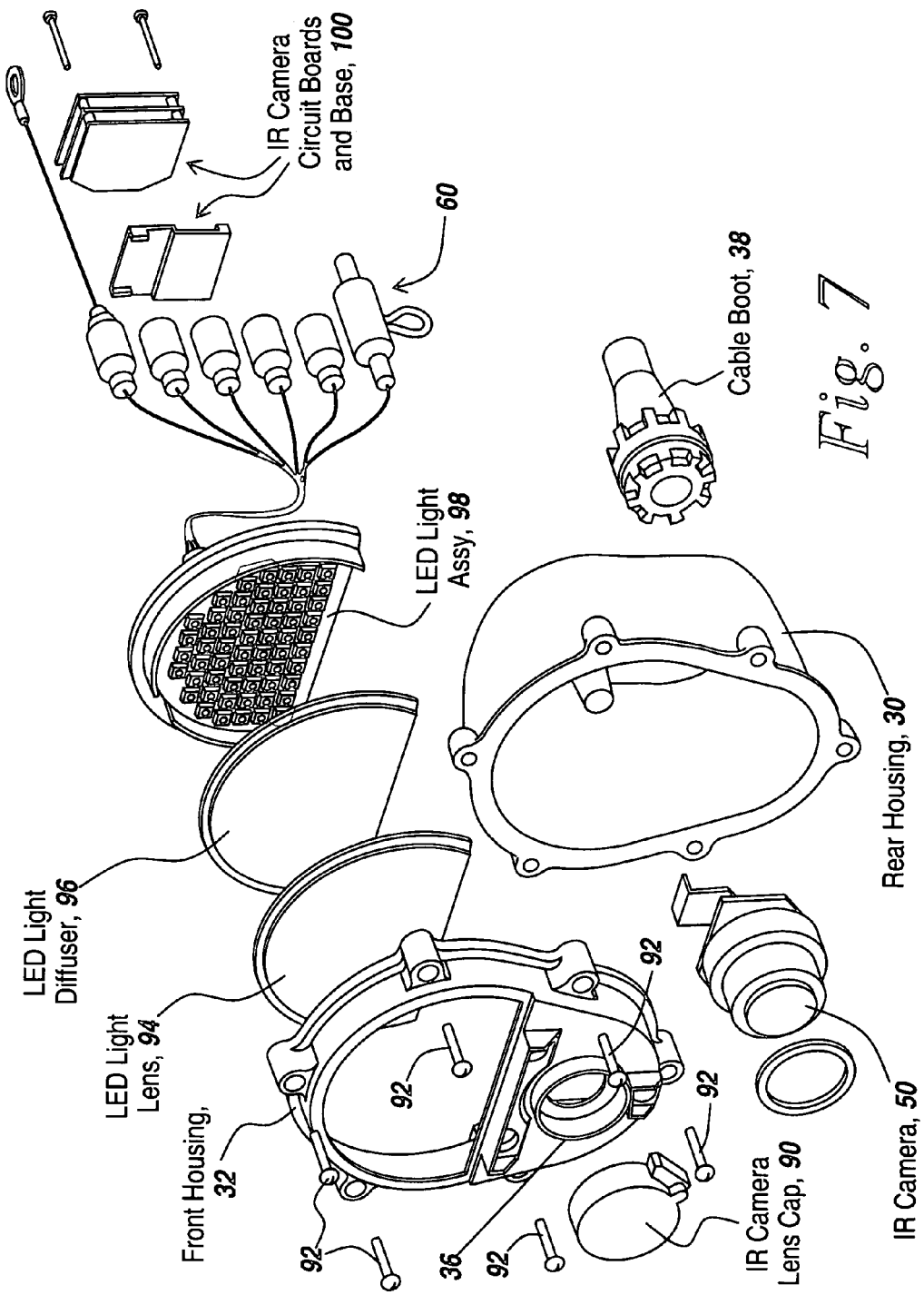
FIG. 7 is an exploded view of the tail light assembly and camera location within the tail light assembly.

Referring now to FIG. 7, what is illustrated is an exploded view of the tail light assembly as modified with cameras and other sensors such that back clamshell 30 constituting the rear housing is provided with a front clamshell housing 32, with the remainder of the modifications carried therein.

As illustrated, an IR camera lens cap 90 covers aperture 36 in front housing 32, with front housing 32 being bolted to rear housing 30 via bolts 92. In back of the front housing is an LED light lens 94, in back of which is an LED light diffuser 96, with cabling 60 running to the LEDs in the LED light assembly.

Also shown in this figure is IR camera 50, which is positioned in aperture 36 below the LED light lens, light diffuser and light assembly. Cabling for the camera is provided through cable boot 38, as is cabling 60. Note that IR camera circuit boards and base 100 are connected to the IR camera 50 through cables that pass through cable boot 38.

Figure 8:
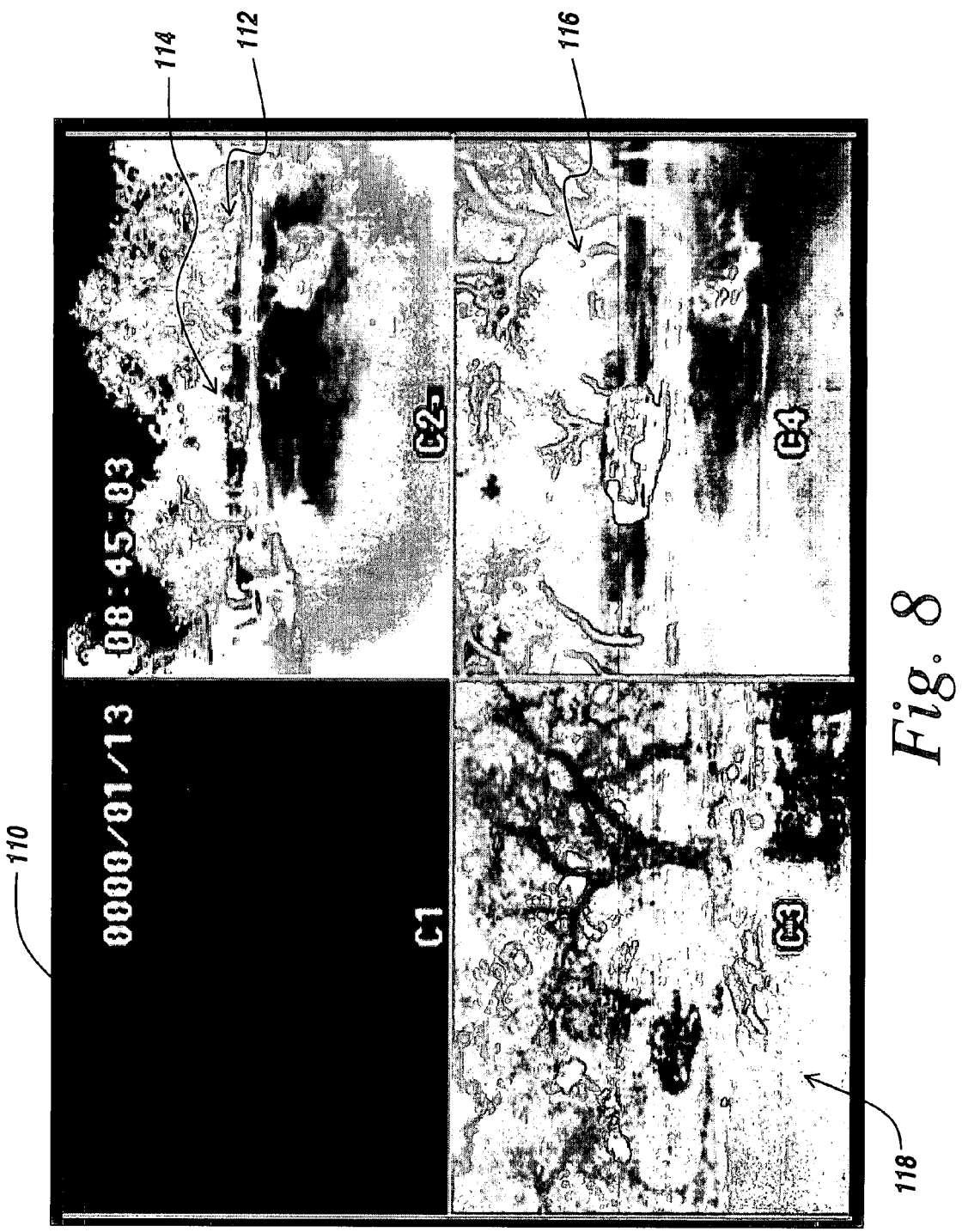
FIG. 8 is a photograph of the display of the output from a camera indicating a visible region output, the infrared outputs of two infrared cameras, and a low-light camera output, indicating what would be visible within an armored vehicle.

Referring now to FIG. 8, what is shown is the result of utilizing a visible light camera, two types of infrared cameras and a low light camera. Here as can be seen at 110 is the result of using a standard visible light CCD camera in a darkened area in which not much of the scene is visible. Thus what is pictured is what is available to the unaided human eye.

Moving to the right, one can see at 112 the scene that is provided by one type of wide field-of-view infrared camera in which a truck 114 is viewable in the distance. A second infrared camera scene such as illustrated at 116 shows the scene with a 40° field of view camera showing a magnified view of the truck, with the heat or thermal signature thereof clearly visible.

Finally, the same scene when viewed with a low-light CCD camera is illustrated at 118.

Figure 9:
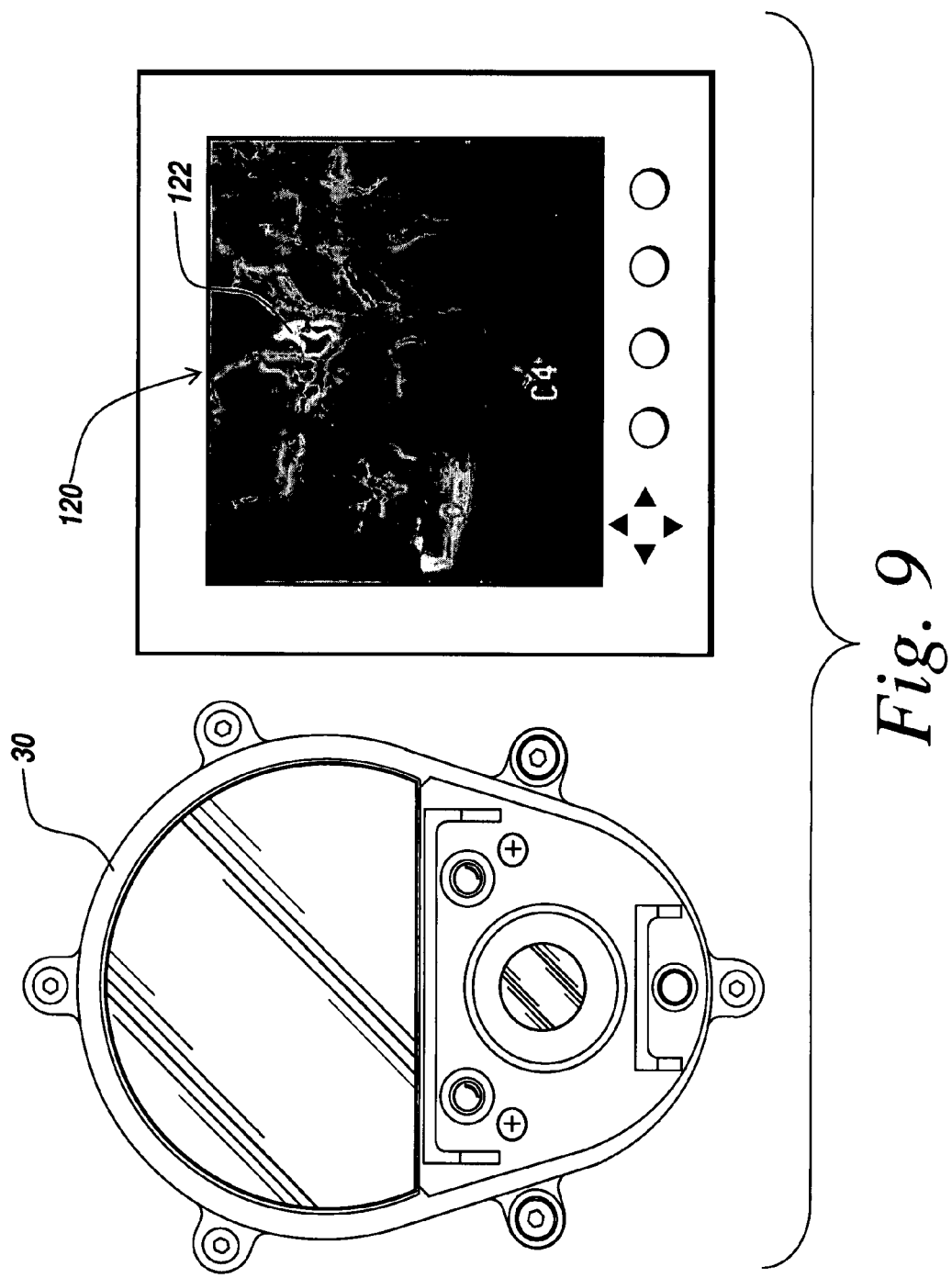
FIG. 9 is a photograph of a display in the vehicle of FIG. 1 indicating the highlighting of a potential threat as the result of thermal imagery.

Referring to FIG. 9, what is seen is that utilizing a near-infrared camera in tail light assembly 30 results in images at display 120 that are highly visible. Here a dull thermal image 122 of an individual in a tree is shown along with a highly visible thermal images of an individual 123, thus to indicate to the troops within the vehicle the presence of an enemy combatant who may be a sniper ready to pick off the troops as they exit the vehicle.

Having been forewarned of the presence of the individual through the use of wide-angle near-infrared cameras located in the tail lights of the vehicle, corrective action can be taken prior to troop exit.

Figure 10:
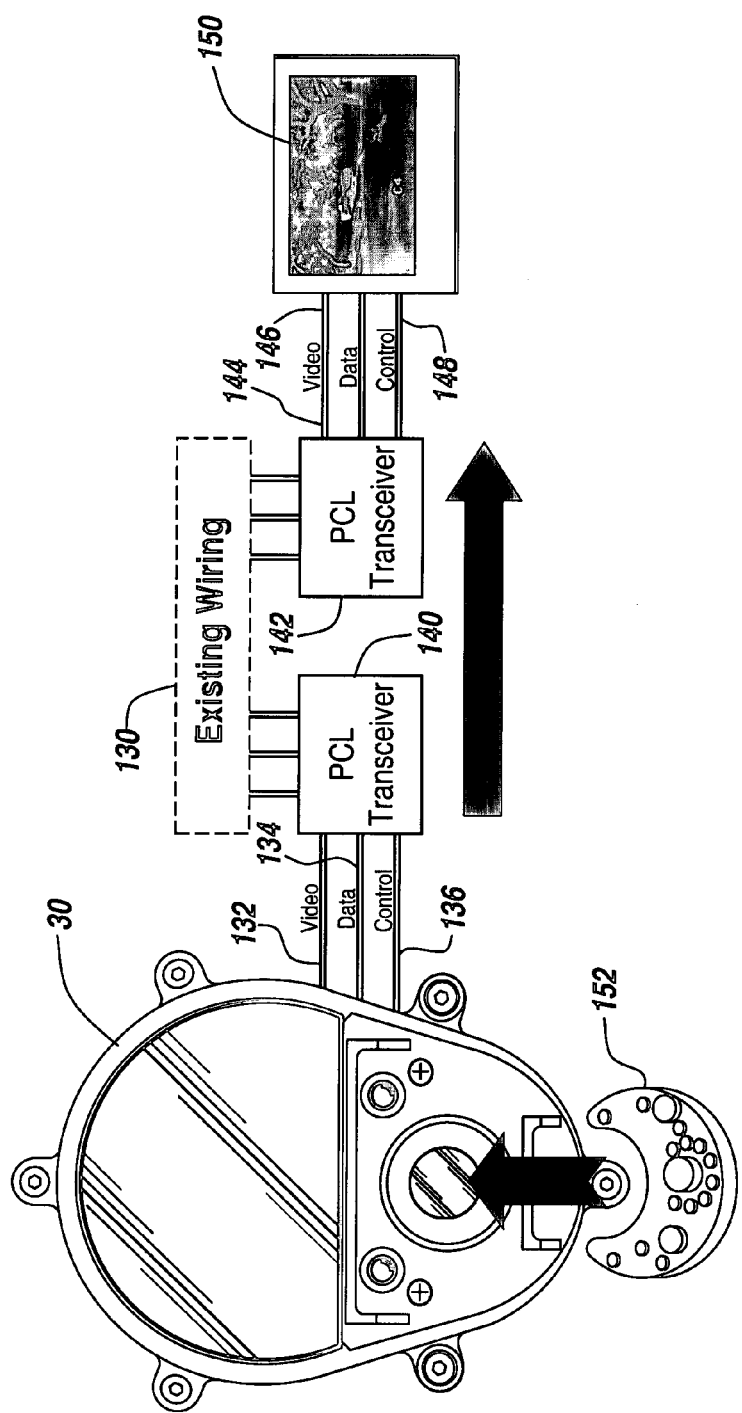
FIG. 10 is a diagrammatic illustration of the system of FIG. 6, illustrating that through the use of existing wiring and the universal tail light assembly, one can provide situational awareness through the mounting of cameras and microelectronics in a universal tail light assembly.

Referring to FIG. 10, what is seen is tail light assembly 30 coupled to existing wiring 130 in which video data and control signals 132, 134 and 136 are coupled between the camera in the tail light assembly and a power line carrier transceiver 140 connected to the existing wiring. An identical power line carrier transceiver 142 is coupled to the existing wiring from which video 144, data 146 and control signals 148 are coupled to monitor 150. Here it can be seen that a module 152, which can carry sensors such as laser warning devices MILES/1 TESS laser decoders and passive IFF circuits, may be placed around the CCD camera with appropriate orifices provided in the face of the tail light assembly.

Figure 11:
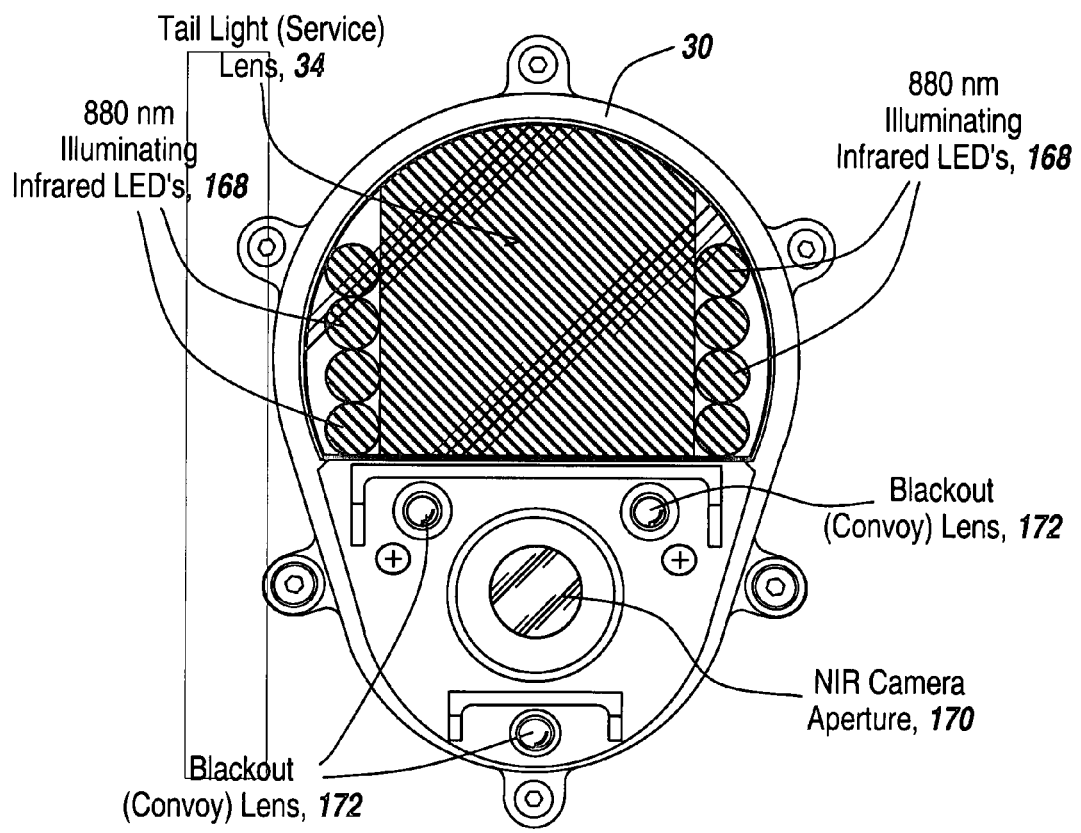
FIG. 11 is a diagrammatic illustration of the use of infrared light-emitting diodes to illuminate the area at the rear of the vehicle to permit use of a standard CCD camera with sensors operating in the near-infrared; and, FIG. 12 is a diagrammatic view of the placement of the camera of FIG. 11 beneath an array of infrared light-emitting diodes used to illuminate objects in the field of view of the camera.

Referring now to FIG. 11, it is possible with the subject tail light assembly retrofit that the tail light assembly 30 may be provided with LEDs in place of incandescent lamps. Moreover, as seen by the array of 880 NM illuminating infrared LEDs 168, one can provide LEDs to either side of the tail light service lens 34 that can illuminate the area surrounding the back of the vehicle. It is the purpose of these infrared LEDs to be able to extend the range of relatively insensitive commercial off-the-shelf near-IR cameras so that the cameras themselves need not be of any special variety in order to obtain increased range.

Figure 12:
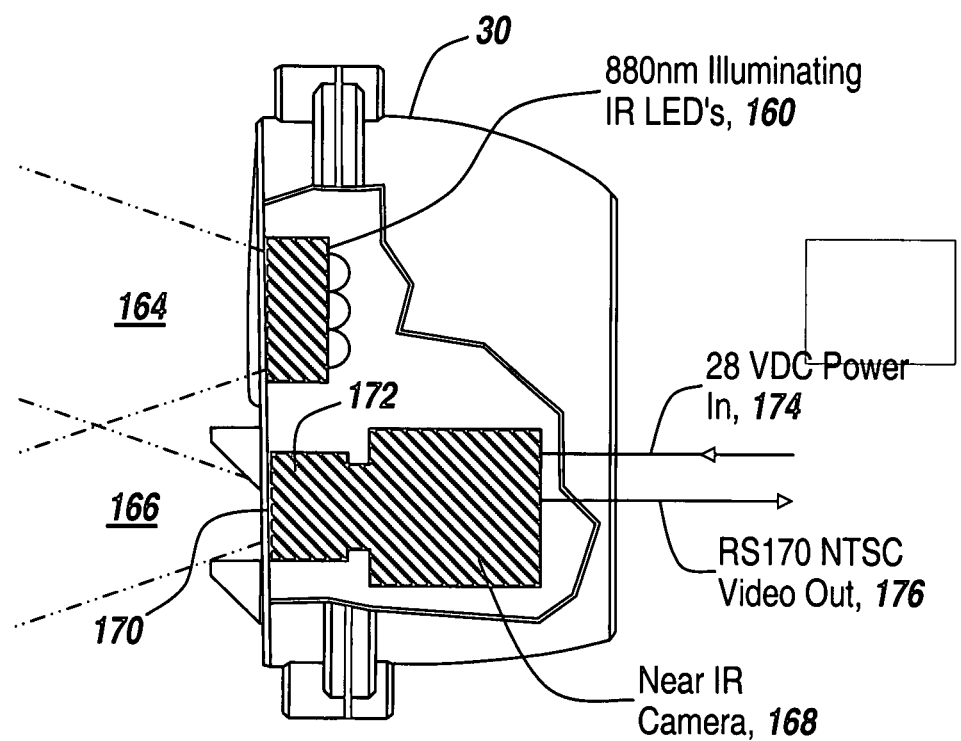

As can be seen in FIG. 12, illuminating IR LEDs 160 provide a swath of light 164, which is co-extensive with the field of view 166 of a near-IR CCD camera 168 that looks out through aperture 170 utilizing lens system 172.

Referring back to FIG. 11, it can be seen that the NIR camera aperture 170 is located in the center of the face plate of the tail light assembly. Also contained on the face plate of the tail light assembly are blackout convoy lenses 172, which surround an IR camera aperture 170.

Referring back to FIG. 12, 28-volt DC power can be applied to all of the electronics within assembly 30 as illustrated by applying power along line 174, whereas RS 170 NTSC video out is available over line 176.

While the subject invention has been described in terms of the modification of a universal tail light assembly, troop-carrying vehicles are also provided with forward marker light assemblies of the same configuration as the marker light/tail light assemblies. It is within the scope of the subject invention to provide such universal forward marker light assemblies with cameras and other sensors as well as the aforementioned LED illumination so as to provide a modification to the standard forward marker assembly to accommodate cameras, sensors and other electronics, the connection to which is facilitated through existing cables and cable boots.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for modifying an armored vehicle having armor with existing holes carrying pass-through therein to provide a tail light assembly that when connected provides stealth situational awareness to troops exiting said armored vehicle, comprising the steps of:

modifying as a retrofit package an existing tail light assembly originally provided on an armored vehicle having armor with existing holes carrying pass-throughs therein for electrical connections through the armor, the holes and pass-throughs having locations and sizes designed to preserve armor integrity so as to protect against penetration to the inside of the armored vehicle, said tail light assembly including front and back clamshells with an aperture in the front clamshell and wide angle infrared thermal imaging camera mounted in the aperture for detecting the thermal signature of troops or apparatus in the vicinity of said vehicle;

adding infrared LEDs to the tail light assembly to assist in stealth infrared image detecting, said infrared LEDs being illuminated at all times situational awareness is required;

utilizing existing armored vehicle wiring or routing apparatus and no more than the existing hull pass-throughs that pass wires from the interior of the armored vehicle to the tail light assembly for connecting the wide angle infrared thermal imaging camera to a display within the vehicle such that no new holes or pass-throughs in the armor are added that would otherwise degrade original armor integrity; and, displaying within the vehicle images from the wide angle thermal imaging camera for alerting troops within the vehicle as to thermal images of objects or persons in the area surrounding the rear of the vehicle prior to the troops exiting the vehicle at the rear, said existing tail light assemblies being retrofitted with a situational awareness system without sacrificing hull integrity to alert the troops to threats at the rear of the vehicle prior to disembarkation thus to provide situational awareness in low light or no light conditions.

2. The method of claim 1, wherein the camera is a near-infrared camera and the display within the vehicle displays thermal images thus to highlight a human thermal threat at the rear of the vehicle on the display within the vehicle, whereby threats at the rear of the vehicle can be displayed regardless of low light conditions and camouflage.

3. The method of claim 1, and further including the step of replacing incandescent lamps in the tail light assembly with light-emitting diodes.

4. The method of claim 3, wherein the light-emitting diodes operate in the 880-nm region of the electromagnetic spectrum.

5. The method of claim 3, wherein the light-emitting diodes provide illumination at the rear of the vehicle.

6. The method of claim 5, wherein the camera utilized is a standard CCD camera operating in the visible region of the electromagnetic spectrum but having sensors that are capable of detecting radiation in the near-infrared, whereby the additional illumination from the light-emitting diodes permits the use of standard CCD cameras.

7. The method of claim 1, and further including locating sensors within the existing tail light assembly.

8. The method of claim 7, wherein the sensors are taken from the group consisting of acoustic sensors, visible light sensors, LIDARS, radars, laser range finders, thermal sensors, electric field sensors and electromagnetic radiation sensors.

* * * * *